US 9,455,935 B2

(12) United States Patent
Yu et al.

(10) Patent No.: US 9,455,935 B2
(45) Date of Patent: *Sep. 27, 2016

(54) REMOTE PORT MIRRORING

(71) Applicant: BROCADE COMMUNICATIONS SYSTEMS, INC., San Jose, CA (US)

(72) Inventors: Shunjia Yu, San Jose, CA (US); Phanidhar Koganti, Fremont, CA (US); John Michael Terry, San Jose, CA (US); Dilip Chatwani, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,964

(22) Filed: Jan. 19, 2016

(65) Prior Publication Data
US 2016/0134563 A1    May 12, 2016

Related U.S. Application Data

(63) Continuation of application No. 13/044,326, filed on Mar. 9, 2011, now Pat. No. 9,246,703.

(60) Provisional application No. 61/352,790, filed on Jun. 8, 2010, provisional application No. 61/380,820, filed on Sep. 8, 2010.

(51) Int. Cl.
*H04L 12/931* (2013.01)
*H04L 12/46* (2006.01)
(Continued)

(52) U.S. Cl.
CPC ............ *H04L 49/208* (2013.01); *H04H 20/93* (2013.01); *H04L 12/4625* (2013.01);
(Continued)

(58) Field of Classification Search
None
See application file for complete search history.

(56) References Cited

U.S. PATENT DOCUMENTS

| 829,529 A | 8/1986 | Keathley |
| 5,390,173 A | 2/1995 | Spinney |

(Continued)

FOREIGN PATENT DOCUMENTS

| CN | 102801599 A | 11/2012 |
| EP | 0579567 | 5/1993 |

(Continued)

OTHER PUBLICATIONS

'An Introduction to Brocade VCS Fabric Technology', BROCADE white paper, http://community.brocade.com/docs/Doc-2954, Dec. 3, 2012.

(Continued)

*Primary Examiner* — Phirin Sam
*Assistant Examiner* — Faiyazkhan Ghafoerkhan
(74) *Attorney, Agent, or Firm* — Shun Yao; Park, Vaughan, Fleming & Dowler LLP

(57) ABSTRACT

A switch that facilitates remote port mirroring is described. The switch can include an encapsulation mechanism and a forwarding mechanism. The encapsulation mechanism can be configured to encapsulate a copy of a first packet in a second packet, thereby preserving header information (e.g., a VLAN identifier and/or a TRILL header) of the first packet. The forwarding mechanism can be configured to forward the first packet using header information of the first packet, and forward the second packet using header information of the second packet. The second packet can be received at a destination switch which extracts the first packet from the second packet, and sends the first packet on a port which is coupled to a network analyzer.

20 Claims, 6 Drawing Sheets

(51) Int. Cl.
*H04H 20/93* (2008.01)
*H04L 12/26* (2006.01)

(52) U.S. Cl.
CPC ...... *H04L 12/4633* (2013.01); *H04L 12/4641* (2013.01); *H04L 12/4675* (2013.01); *H04L 43/10* (2013.01); *H04L 43/18* (2013.01)

(56) References Cited

U.S. PATENT DOCUMENTS

| | | | |
|---|---|---|---|
| 5,802,278 A | 9/1998 | Isfeld | |
| 5,878,232 A | 3/1999 | Marimuthu | |
| 5,959,968 A | 9/1999 | Chin | |
| 5,973,278 A | 10/1999 | Wehrli, III | |
| 5,983,278 A | 11/1999 | Chong | |
| 6,041,042 A * | 3/2000 | Bussiere | H04L 12/24 370/245 |
| 6,085,238 A | 7/2000 | Yuasa | |
| 6,104,696 A | 8/2000 | Kadambi | |
| 6,185,214 B1 | 2/2001 | Schwartz | |
| 6,185,241 B1 | 2/2001 | Sun | |
| 6,438,106 B1 | 8/2002 | Pillar | |
| 6,498,781 B1 | 12/2002 | Bass | |
| 6,542,266 B1 | 4/2003 | Phillips | |
| 6,633,761 B1 | 10/2003 | Singhal | |
| 6,771,610 B1 | 8/2004 | Seaman | |
| 6,873,602 B1 | 3/2005 | Ambe | |
| 6,937,576 B1 | 8/2005 | Di Benedetto | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury | |
| 7,316,031 B2 | 1/2008 | Griffith | |
| 7,330,897 B2 | 2/2008 | Baldwin | |
| 7,380,025 B1 | 5/2008 | Riggins | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 | 7/2009 | Kuo | |
| 7,558,273 B1 | 7/2009 | Grosser | |
| 7,571,447 B2 | 8/2009 | Ally | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 * | 8/2010 | Mehta | H04L 12/465 370/401 |
| 7,792,920 B2 | 9/2010 | Istvan | |
| 7,796,593 B1 | 9/2010 | Ghosh | |
| 7,808,992 B2 | 10/2010 | Homchaudhuri | |
| 7,836,332 B2 | 11/2010 | Hara | |
| 7,843,906 B1 | 11/2010 | Chidambaram | |
| 7,843,907 B1 | 11/2010 | Abou-Emara | |
| 7,860,097 B1 | 12/2010 | Lovett | |
| 7,898,959 B1 | 3/2011 | Arad | |
| 7,924,837 B1 | 4/2011 | Shabtay | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,040,899 B2 * | 10/2011 | Shei | H04L 49/552 370/395.5 |
| 8,054,832 B1 | 11/2011 | Shukla | |
| 8,068,442 B1 | 11/2011 | Kompella | |
| 8,078,704 B2 | 12/2011 | Lee | |
| 8,102,781 B2 | 1/2012 | Smith | |
| 8,102,791 B2 | 1/2012 | Tang | |
| 8,116,307 B1 * | 2/2012 | Thesayi | H04L 12/2602 370/389 |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 * | 7/2012 | Doiron | H04L 43/028 370/235 |
| 8,213,336 B2 | 7/2012 | Smith | |
| 8,218,540 B1 * | 7/2012 | Busch | H04L 12/4625 370/389 |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake | |
| 8,369,335 B2 | 2/2013 | Jha | |
| 8,369,347 B2 | 2/2013 | Xiong | |
| 8,392,496 B2 | 3/2013 | Linden | |
| 8,462,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 * | 12/2013 | Natarajan | H04L 43/026 370/389 |
| 8,706,905 B1 | 4/2014 | McGlaughlin | |
| 8,724,456 B1 | 5/2014 | Hong | |
| 8,806,031 B1 | 8/2014 | Kondur | |
| 8,826,385 B2 | 9/2014 | Congdon | |
| 8,937,865 B1 | 1/2015 | Kumar | |
| 8,995,272 B2 | 3/2015 | Agarwal | |
| 9,246,703 B2 * | 1/2016 | Yu | H04L 12/4625 |
| 2001/0005527 A1 | 6/2001 | Vaeth | |
| 2001/0055274 A1 * | 12/2001 | Hegge | H04L 12/2602 370/229 |
| 2002/0019904 A1 | 2/2002 | Katz | |
| 2002/0021701 A1 | 2/2002 | Lavian | |
| 2002/0039350 A1 | 4/2002 | Wang | |
| 2002/0054593 A1 | 5/2002 | Morohashi | |
| 2002/0091795 A1 | 7/2002 | Yip | |
| 2003/0041085 A1 | 2/2003 | Sato | |
| 2003/0123393 A1 | 7/2003 | Feuerstraeter | |
| 2003/0174706 A1 | 9/2003 | Shankar | |
| 2003/0189905 A1 | 10/2003 | Lee | |
| 2003/0216143 A1 | 11/2003 | Roese | |
| 2004/0001433 A1 | 1/2004 | Gram | |
| 2004/0003094 A1 * | 1/2004 | See | H04L 43/026 709/227 |
| 2004/0010600 A1 | 1/2004 | Baldwin | |
| 2004/0049699 A1 * | 3/2004 | Griffith | H04L 63/1408 726/23 |
| 2004/0057430 A1 * | 3/2004 | Paavolainen | H04L 12/1836 370/390 |
| 2004/0117508 A1 | 6/2004 | Shimizu | |
| 2004/0120326 A1 | 6/2004 | Yoon | |
| 2004/0156313 A1 | 8/2004 | Hofmeister | |
| 2004/0165595 A1 | 8/2004 | Holmgren | |
| 2004/0165596 A1 | 8/2004 | Garcia | |
| 2004/0213232 A1 * | 10/2004 | Regan | H04L 12/2602 370/390 |
| 2005/0007951 A1 | 1/2005 | Lapuh | |

(56) References Cited

U.S. PATENT DOCUMENTS

| | | | |
|---|---|---|---|
| 2005/0044199 A1 | 2/2005 | Shiga | |
| 2005/0074001 A1 | 4/2005 | Mattes | |
| 2005/0094568 A1 | 5/2005 | Judd | |
| 2005/0094630 A1 | 5/2005 | Valdevit | |
| 2005/0122979 A1 | 6/2005 | Gross | |
| 2005/0157645 A1 | 7/2005 | Rabie | |
| 2005/0157751 A1 | 7/2005 | Rabie | |
| 2005/0169188 A1 | 8/2005 | Cometto | |
| 2005/0195813 A1 | 9/2005 | Ambe | |
| 2005/0207423 A1* | 9/2005 | Herbst | H04L 12/46 370/395.7 |
| 2005/0213561 A1 | 9/2005 | Yao | |
| 2005/0220096 A1 | 10/2005 | Friskney | |
| 2005/0265356 A1 | 12/2005 | Kawarai | |
| 2005/0278565 A1* | 12/2005 | Frattura | G06F 21/6263 714/5.1 |
| 2006/0007869 A1 | 1/2006 | Hirota | |
| 2006/0018302 A1 | 1/2006 | Ivaldi | |
| 2006/0023707 A1 | 2/2006 | Makishima | |
| 2006/0029072 A1* | 2/2006 | Perera | H04L 49/552 370/389 |
| 2006/0034292 A1 | 2/2006 | Wakayama | |
| 2006/0059163 A1* | 3/2006 | Frattura | H04L 12/2602 |
| 2006/0062187 A1 | 3/2006 | Rune | |
| 2006/0072550 A1* | 4/2006 | Davis | H04L 63/00 370/352 |
| 2006/0083254 A1 | 4/2006 | Ge | |
| 2006/0093254 A1 | 5/2006 | Mozdy | |
| 2006/0098589 A1 | 5/2006 | Kreeger | |
| 2006/0140130 A1* | 6/2006 | Kalkunte | H04L 12/2602 370/241 |
| 2006/0143300 A1* | 6/2006 | See | H04L 43/026 709/227 |
| 2006/0168109 A1 | 7/2006 | Warmenhoven | |
| 2006/0184937 A1 | 8/2006 | Abels | |
| 2006/0221960 A1 | 10/2006 | Borgione | |
| 2006/0235995 A1 | 10/2006 | Bhatia | |
| 2006/0242311 A1 | 10/2006 | Mai | |
| 2006/0245438 A1* | 11/2006 | Sajassi | H04L 12/18 370/399 |
| 2006/0245439 A1 | 11/2006 | Sajassi | |
| 2006/0251067 A1 | 11/2006 | DeSanti | |
| 2006/0256767 A1 | 11/2006 | Suzuki | |
| 2006/0265515 A1 | 11/2006 | Shiga | |
| 2006/0285499 A1 | 12/2006 | Tzeng | |
| 2006/0291388 A1 | 12/2006 | Amdahl | |
| 2007/0036178 A1 | 2/2007 | Hares | |
| 2007/0083625 A1 | 4/2007 | Chamdani | |
| 2007/0086362 A1* | 4/2007 | Kato | H04L 41/00 370/254 |
| 2007/0094464 A1* | 4/2007 | Sharma | G06F 11/2064 711/162 |
| 2007/0097968 A1 | 5/2007 | Du | |
| 2007/0098006 A1 | 5/2007 | Parry | |
| 2007/0116224 A1 | 5/2007 | Burke | |
| 2007/0116422 A1 | 5/2007 | Reynolds | |
| 2007/0156659 A1 | 7/2007 | Lim | |
| 2007/0177525 A1 | 8/2007 | Wijnands | |
| 2007/0177597 A1 | 8/2007 | Ju | |
| 2007/0183313 A1 | 8/2007 | Narayanan | |
| 2007/0211712 A1 | 9/2007 | Fitch | |
| 2007/0258449 A1* | 11/2007 | Bennett | H04L 63/145 370/389 |
| 2007/0274234 A1 | 11/2007 | Kubota | |
| 2007/0289017 A1 | 12/2007 | Copeland, III | |
| 2008/0052487 A1 | 2/2008 | Akahane | |
| 2008/0065760 A1 | 3/2008 | Damm | |
| 2008/0080517 A1 | 4/2008 | Roy | |
| 2008/0095160 A1* | 4/2008 | Yadav | H04L 12/1886 370/390 |
| 2008/0101386 A1 | 5/2008 | Gray | |
| 2008/0112400 A1 | 5/2008 | Dunbar | |
| 2008/0133760 A1 | 6/2008 | Berkvens | |
| 2008/0159277 A1 | 7/2008 | Vobbilisetty | |
| 2008/0172492 A1 | 7/2008 | Raghunath | |
| 2008/0181196 A1 | 7/2008 | Regan | |
| 2008/0181243 A1 | 7/2008 | Vobbilisetty | |
| 2008/0186981 A1 | 8/2008 | Seto | |
| 2008/0205377 A1 | 8/2008 | Chao | |
| 2008/0219172 A1 | 9/2008 | Mohan | |
| 2008/0225852 A1 | 9/2008 | Raszuk | |
| 2008/0225853 A1 | 9/2008 | Melman | |
| 2008/0228897 A1 | 9/2008 | Ko | |
| 2008/0240129 A1 | 10/2008 | Elmeleegy | |
| 2008/0267179 A1 | 10/2008 | Lavigne | |
| 2008/0279181 A1* | 11/2008 | Shake | H04L 1/08 370/389 |
| 2008/0285458 A1 | 11/2008 | Lysne | |
| 2008/0285555 A1 | 11/2008 | Ogasahara | |
| 2008/0298248 A1 | 12/2008 | Roeck | |
| 2008/0304498 A1* | 12/2008 | Jorgensen | H04L 12/4641 370/401 |
| 2008/0310342 A1 | 12/2008 | Kruys | |
| 2008/0310421 A1* | 12/2008 | Teisberg | H04L 12/4641 370/395.53 |
| 2009/0022069 A1 | 1/2009 | Khan | |
| 2009/0037607 A1 | 2/2009 | Farinacci | |
| 2009/0042270 A1 | 2/2009 | Dolly | |
| 2009/0044270 A1 | 2/2009 | Shelly | |
| 2009/0067422 A1 | 3/2009 | Poppe | |
| 2009/0067442 A1 | 3/2009 | Killian | |
| 2009/0079560 A1 | 3/2009 | Fries | |
| 2009/0080345 A1 | 3/2009 | Gray | |
| 2009/0080421 A1* | 3/2009 | Ou | H04L 49/208 370/389 |
| 2009/0080425 A1* | 3/2009 | Parker | H04L 12/4645 370/390 |
| 2009/0083445 A1 | 3/2009 | Ganga | |
| 2009/0092042 A1 | 4/2009 | Yuhara | |
| 2009/0092043 A1 | 4/2009 | Lapuh | |
| 2009/0106405 A1 | 4/2009 | Mazarick | |
| 2009/0116381 A1 | 5/2009 | Kanda | |
| 2009/0129384 A1 | 5/2009 | Regan | |
| 2009/0138577 A1 | 5/2009 | Casado | |
| 2009/0138752 A1 | 5/2009 | Graham | |
| 2009/0161584 A1 | 6/2009 | Guan | |
| 2009/0161670 A1 | 6/2009 | Shepherd | |
| 2009/0168647 A1 | 7/2009 | Holness | |
| 2009/0199177 A1 | 8/2009 | Edwards | |
| 2009/0204965 A1 | 8/2009 | Tanaka | |
| 2009/0213783 A1 | 8/2009 | Moreton | |
| 2009/0222879 A1 | 9/2009 | Kostal | |
| 2009/0232031 A1 | 9/2009 | Vasseur | |
| 2009/0245137 A1 | 10/2009 | Hares | |
| 2009/0245242 A1 | 10/2009 | Carlson | |
| 2009/0246137 A1 | 10/2009 | Hadida | |
| 2009/0252049 A1 | 10/2009 | Ludwig | |
| 2009/0252061 A1 | 10/2009 | Small | |
| 2009/0260083 A1 | 10/2009 | Szeto | |
| 2009/0274060 A1* | 11/2009 | Taylor | H04L 43/12 370/252 |
| 2009/0279558 A1* | 11/2009 | Davis | H04L 45/00 370/412 |
| 2009/0292858 A1 | 11/2009 | Lambeth | |
| 2009/0316721 A1 | 12/2009 | Kanda | |
| 2009/0323708 A1 | 12/2009 | Ihle | |
| 2009/0327392 A1 | 12/2009 | Tripathi | |
| 2009/0327462 A1 | 12/2009 | Adams | |
| 2009/0328392 | 12/2009 | Tripathi | |
| 2010/0027420 A1 | 2/2010 | Smith | |
| 2010/0046471 A1* | 2/2010 | Hattori | H04B 7/022 370/331 |
| 2010/0054260 A1 | 3/2010 | Pandey | |
| 2010/0061269 A1* | 3/2010 | Banerjee | H04L 12/4675 370/254 |
| 2010/0074175 A1 | 3/2010 | Banks | |
| 2010/0097941 A1 | 4/2010 | Carlson | |
| 2010/0103813 A1 | 4/2010 | Allan | |
| 2010/0103939 A1 | 4/2010 | Carlson | |
| 2010/0131636 A1 | 5/2010 | Suri | |
| 2010/0158024 A1 | 6/2010 | Sajassi | |
| 2010/0165877 A1 | 7/2010 | Shukla | |
| 2010/0165995 A1 | 7/2010 | Mehta | |
| 2010/0168467 A1 | 7/2010 | Johnston | |

(56) References Cited

U.S. PATENT DOCUMENTS

| | | |
|---|---|---|
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1* | 12/2010 | Kotalwar ............ H04L 12/1886 370/390 |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0055274 A1 | 3/2011 | Scales |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1* | 6/2011 | McDysan ............ H04L 45/306 709/225 |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1* | 9/2011 | Altekar ............... H04L 12/4633 709/236 |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1* | 12/2011 | Yu ...................... H04L 12/4625 370/392 |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033669 A1 | 2/2012 | Mohandas |
| 2012/0075991 A1 | 3/2012 | Sugita |
| 2012/0099567 A1* | 4/2012 | Hart ................... H04L 12/4633 370/338 |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane |
| 2013/0124707 A1 | 5/2013 | Ananthapadmanabha |
| 2013/0127848 A1 | 5/2013 | Joshi |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1* | 10/2013 | Natarajan ............ H04L 43/026 370/390 |
| 2013/0272135 A1 | 10/2013 | Leong |
| 2013/0301642 A1 | 11/2013 | Radhakrishnan |
| 2014/0044126 A1 | 2/2014 | Sabhanatarajan |
| 2014/0105034 A1 | 4/2014 | Sun |
| 2014/0177428 A1* | 6/2014 | Sinha ................. H04L 41/0686 370/216 |

FOREIGN PATENT DOCUMENTS

| | | |
|---|---|---|
| EP | 1398920 A2 | 3/2004 |
| EP | 1916807 A2 | 4/2008 |
| EP | 2001167 A1 | 10/2008 |
| WO | 2008056838 | 5/2008 |
| WO | 2009042919 | 4/2009 |
| WO | 2010111142 A1 | 9/2010 |
| WO | 2014031781 | 2/2014 |

OTHER PUBLICATIONS

'RBridges: Base Protocol Specification', IETF Draft, Perlman et al., Jun. 26, 2009.

'Switched Virtual Networks. Internetworking Moves Beyond Bridges and Routers' Data Communications, McGraw Hill. New York, US, vol. 23, No. 12, Sep. 1, 1994, pp. 66-70,72,74, XP000462385 ISSN: 0363-6399.

U.S. Appl. No. 13/030,806 Office Action dated Dec. 3, 2012.

Office action dated Apr. 26, 2012, U.S. Appl. No. 12/725,249, filed Mar. 16, 2010.

Office action dated Sep. 12, 2012, U.S. Appl. No. 12/725,249, filed Mar. 16, 2010.

(56) References Cited

OTHER PUBLICATIONS

Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, for U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Brocade Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
Eastlake, D. et al., 'RBridges: TRILL Header Options', Dec. 24, 2009, pp. 1-17, TRILL Working Group.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.

(56) References Cited

OTHER PUBLICATIONS

Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004, pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998, XP002135272 Retrieved from the Internet: URL:ftp://ftp.isi.edu/in-notes/rfc2338.txt [retrieved on Apr. 10, 2000].
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-narten-n. vo3-over I ay-problem -statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,752, filed Apr. 22, 2011, from Park, Jung H., dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.

(56) References Cited

OTHER PUBLICATIONS

Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 29, 2013.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 13/092,887 with dated Jan. 6, 2014.
Perlman, Radia et al., 'Challenges and Opportunities in the Design of TRILL: a Routed layer 2 Technology', 2009.
Perlman, Radia et al., 'RBridge VLAN Mapping', TRILL Working Group, Dec. 4, 2009, pp. 1-12.
Perlman, Radia et al., 'RBridges: Base Protocol Specification; Draft-ietf-trill-rbridge-protocol-16.txt', Mar. 3, 2010, pp. 1-117.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
Rosen, E. et al., "BGP/MPLS VPNs", Mar. 1999.
S. Nadas et al., 'Virtual Router Redundancy Protocol (VRRP) Version 3 for IPv4 and IPv6', Internet Engineering Task Force, Mar. 2010.
Touch, J. et al., 'Transparent Interconnection of Lots of Links (TRILL): Problem and Applicability Statement', May 2009, Network Working Group, pp. 1-17.
TRILL Working Group Internet-Draft Intended status: Proposed Standard RBridges: Base Protocol Specificaiton Mar. 3, 2010.
Zhai F. Hu et al. 'RBridge: Pseudo-Nickname; draft-hu-trill-pseudonode-nickname-02.txt', May 15, 2012.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Office action dated Jun. 8, 2015, U.S. Appl. No. 14/178,042, filed Feb. 11, 2014.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated Apr. 1, 2015 U.S. Appl. No. 13/656,438 filed Oct. 19, 2012.
Office Action Dated Jun. 10, 2015, U.S. Appl. No. 13/890,150, filed May 8, 2013.
Mahalingam "VXLAN: A Framework for Overlaying Virtualized Layer 2 Networks over Layer 3 Networks" Oct. 17, 2013 pp. 1-22, Sections 1, 4 and 4.1.
Siamak Azodolmolky et al. "Cloud computing networking: Challenges and opportunities for innovations", IEEE Communications Magazine, vol. 51, No. 7, Jul. 1, 2013.
Zhai F. Hu et al. 'RBridge: Pseudo-Nickname; draft-hu-trill-pseudonodenickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438 filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.

* cited by examiner

REMOTE PORT MIRRORING

RELATED APPLICATION

This application is a continuation of U.S. application Ser. No. 13/044,326, entitled "Remote Port Mirroring," by inventors Shunjia Yu, Phanidhar Koganti, John Michael Terry, and Dilip Chatwani, filed 9 Mar. 2011, which claims the benefit of U.S. Provisional Application No. 61/352,790, entitled "Remote Port Monitoring in TRILL Networks," filed 8 Jun. 2010, and U.S. Provisional Application No. 61/380,820, entitled "Remote Port Mirroring," filed 8 Sep. 2010, the disclosures of which are incorporated by reference herein.

BACKGROUND

1. Technical Field

This disclosure relates to computer networking. More specifically, this disclosure relates to systems and techniques for remote port mirroring.

2. Related Art

Computer networking has permeated almost all aspects of our daily lives—at work we use computer networks to access files and send and receive emails, and at home we use them to make telephone calls, watch movies, and browse the World Wide Web (WWW). Since computer networks have become an important part of our daily lives, it is very important to ensure that network problems can be identified and resolved quickly.

Network analysis is an important technique that is used for identifying and resolving network problems. In network analysis, packets traversing the network are analyzed to ensure that the packets have the correct information. Unfortunately, some conventional techniques that facilitate network analysis do not provide all of the information necessary to identify and resolve network problems.

SUMMARY

Some embodiments of the present invention provide a system (e.g., a switch) that can perform remote port mirroring. Remote port mirroring is a technique in which certain packets are copied and sent across a network to a network analyzer. The network analyzer can then be used to analyze the copies of the packets to help identify and resolve network problems.

In some embodiments, a switch capable of remote port mirroring includes an encapsulation mechanism and a forwarding mechanism. The encapsulation mechanism can be configured to encapsulate a copy of a first packet in a second packet. Encapsulating the copy of the first packet in the second packet preserves header information of the first packet. Specifically, in some embodiments, the VLAN (Virtual Local Area Network) identifier in the first packet's header is preserved. In some embodiments, the TRILL header of the packet is preserved. The forwarding mechanism can be configured to forward the first packet using header information of the first packet, and forward the second packet using header information of the second packet.

In some embodiments, the first packet is an Ethernet packet (with or without one or more VLAN tags) and the second packet is a TRILL (Transparent Interconnection of Lots of Links) packet. In some embodiments, both the first packet and the second packet are TRILL packets. Note that a packet can be a unicast, a multicast, or a broadcast packet.

Specifically, in some embodiments, the first packet is either a unicast packet or a multicast packet, and the second packet is either a unicast packet that is sent to a network analyzer or a multicast packet which is sent to a multicast address which is associated with a multicast group that includes the network analyzer.

Some embodiments of the present invention provide a network which includes a source switch and at least two destination switches. The source switch may be configured to: encapsulate a copy of a first packet in a second packet; send the first packet to a first destination switch; and send the second packet to a second destination switch. The second destination switch may be configured to: receive the second packet; extract the copy of the first packet from the second packet; and send the copy of the first packet on a port which is coupled to a network analyzer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

TRILL (Transparent Interconnection of Lots of Links)

TRILL combines the advantages of bridging and routing. Bridges (e.g., devices that perform layer-2 forwarding) can transparently connect multiple links to create a single local area network. Without TRILL, bridges use the spanning tree protocol (STP) which restricts the topology on which traffic is forwarded to a tree to prevent loops. Unfortunately, forwarding the traffic over a tree causes traffic concentration on the links that correspond to the tree edges, leaving other links completely unutilized. Unlike bridges, Internet Protocol (IP) routers (e.g., devices that perform IP forwarding) do not need to create a spanning tree for forwarding traffic. However, routers that forward IP traffic require more configuration than bridges, and moving nodes in an IP network requires changing the IP address of the nodes. Each link in an IP network is associated with an address prefix, and all nodes on that link must have that IP prefix. If a node moves to another link that has a different IP prefix, the node must change its IP address. Unless otherwise stated, the term "IP" refers to both "IPv4" and "IPv6" in this disclosure.

A TRILL network includes "routing bridges" (referred to as RBridges) which route packets, but like bridges, learn layer-2 address locations through receipt of packets. Since packets are routed, packet forwarding is not limited to a spanning tree. Also, since a hop count is included in a TRILL packet, packets do not circulate forever in the network in the presence of loops. Further, since the layer-2 address locations are learned, a TRILL network allows IP nodes to move from one link to another in the network without any restrictions.

Figure 1:
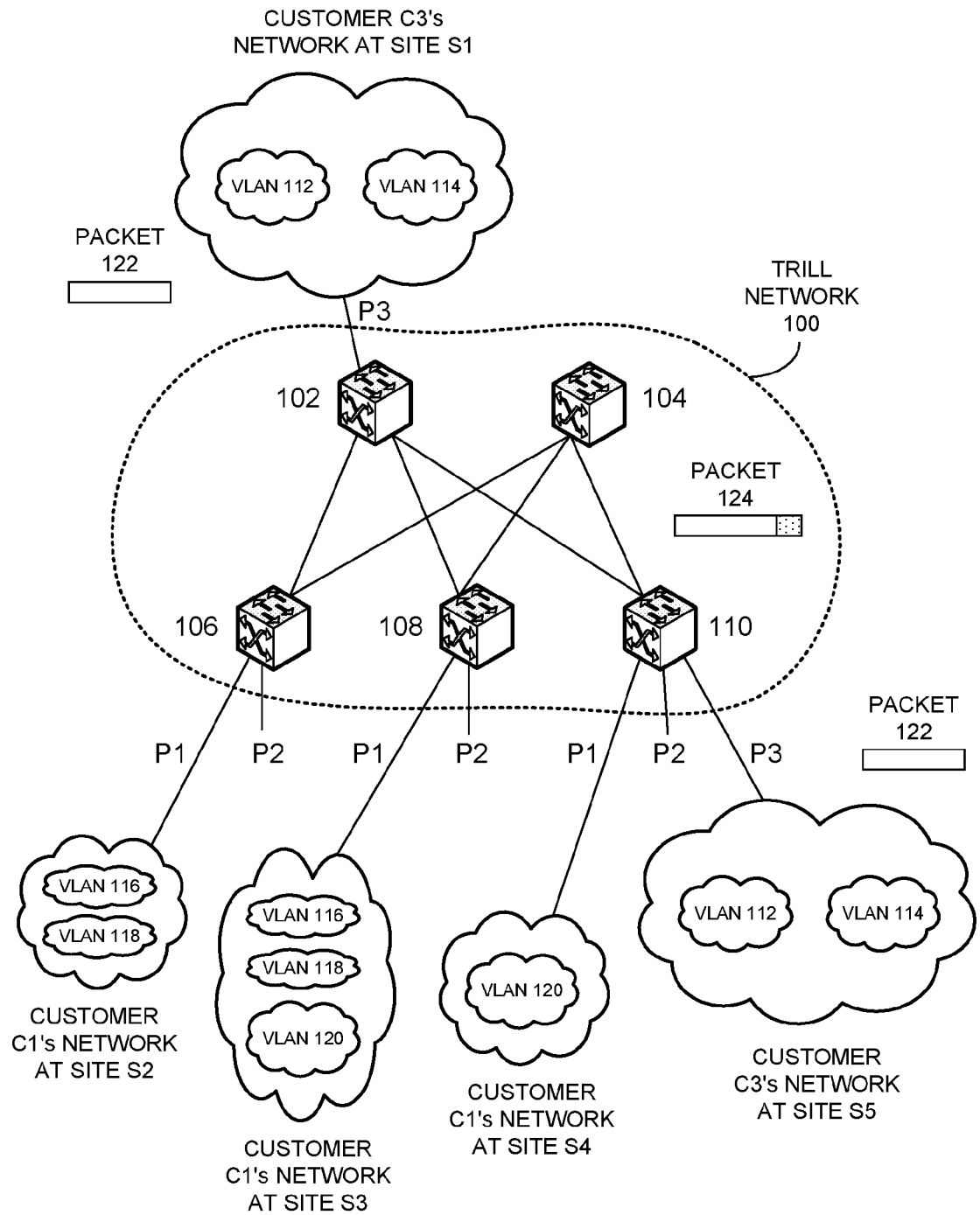
FIG. 1 illustrates a TRILL network in accordance with some embodiments of the present invention.

FIG. 1 illustrates a TRILL network in accordance with some embodiments of the present invention. TRILL network 100 can be a service provider's network which includes core RBridges 102 and 104 and edge RBridges 106, 108, and 110. RBridges 102, 106, 108, and 110 are coupled to customer devices, whereas RBridge 104 is not. Specifically, port P3 on RBridge 102 can be coupled to a device in customer C3's network at site S1; ports labeled P1 on RBridges 106, 108, and 110 can be coupled to devices in customer C1's networks at sites S2, S3, and S4, respectively; and port P3 on RBridge 110 can be coupled to a device in customer C3's network at site S5. Note that the port numbers in FIG. 1 match the customer numbers, i.e., ports labeled P1 are associated with customer C1, ports labeled P3 are associated with customer C3, etc. This has been done for ease of discourse. In general, any port on any RBridge can potentially be assigned to one or more virtual networks that are associated with one or more customers.

A virtual local area network (VLAN) in a customer's network may span multiple customer sites. For example, VLANs 112 and 114 in customer C3's network include nodes in sites S1 and S5. Similarly, VLANs 116 and 118 in customer C1's network include nodes in sites S2 and S3, and VLAN 120 in customer C1's network includes nodes in sites S3 and S4.

Nodes that belong to the same VLAN, but which are located at different sites, can communicate with each other transparently through TRILL network 100. Specifically, the ingress RBridge can encapsulate a packet (e.g., an Ethernet packet with or without one or more VLAN tags) received from a customer and route the packet within TRILL network 100 using a TRILL header. The egress RBridge can then strip the TRILL header and send the original customer packet on the appropriate port. For example, packet 122 can originate in customer C3's network at site S1, and be received on port P3 of RBridge 102 with a VLAN tag associated with VLAN 112. Next, RBridge 102, which is the ingress RBridge for this packet, can encapsulate packet 122 by adding a TRILL header to obtain packet 124 (the TRILL header is the shaded portion in packet 124). Next, the TRILL header of packet 124 can be used to route packet 124 through TRILL network 100 until packet 124 reaches RBridge 110, which is the egress RBridge for the packet. RBridge 110 can then strip away the TRILL header on packet 124 to obtain the original packet 122, and send packet 122 on port P3 so that the packet can be delivered to the intended destination in VLAN 112 in customer C3's network at site S5. In FIG. 1, the packet that is received at the ingress RBridge and the packet that is sent from the egress RBridge are shown to be the same. However, these packets can be different. For example, if VLAN translation is being performed, then the packet that is received at the ingress RBridge and the packet that is sent from the egress RBridge can have different VLAN tags.

Details of the TRILL packet format and RBridge forwarding can be found in IETF draft "RBridges: Base Protocol Specification," available at http://tools.ietf.org/html/draft-ietf-trill-rbridge-protocol-16, which is incorporated herein by reference.

Although some examples in this disclosure are presented in the context of a TRILL network that includes RBridges, the present invention is not limited to TRILL networks or RBridges. The terms "frame" or "packet" generally refer to a group of bits. The use of the term "frame" is not intended to limit the present invention to layer-2 networks. Similarly, the use of the term "packet" is not intended to limit the present invention to layer-3 networks. Unless otherwise stated, the terms "frame" or "packet" may be substituted with other terms that refer to a group of bits, such as "cell" or "datagram."

Network Virtualization

Network virtualization enables a service provider to provision virtual networks (VNs) over a common network infrastructure. To a user on a VN it appears as if the traffic is being carried over a separate network that has been specifically built for the user. However, in reality, the traffic from multiple VNs may be carried over a common network infrastructure.

Network virtualization has many uses. For example, network virtualization can be used to create multiple, logically distinct networks on the same physical network to comply with government regulations. Other uses of network virtualization include, but are not limited to, partitioning network resources between different organizations in a company thereby reducing network costs and simplifying network management.

One approach for addressing the problem that is solved by network virtualization is to duplicate resources (e.g., routers, switches, etc.) in the network so that the resources can be provisioned on a per-customer basis. However, this approach is impractical because it is costly and it is not scalable.

Some embodiments of the present invention implement network virtualization and/or partitioning in the TRILL network by embedding a VPN identifier in a TRILL option field in the TRILL header. Specifically, the ingress RBridge can determine a VPN identifier for each packet it receives from a customer, and embed the VPN identifier in a TRILL option field in the TRILL header. Next, the VPN identifier can be used to support network virtualization and/or partitioning in the TRILL network. Specifically, once the VPN identifier is embedded into the TRILL header, RBridges in the TRILL network can use the VPN identifier to determine how to handle the packet.

In some embodiments, the system can use a service provider VLAN identifier to implement network virtualization and/or partitioning. Specifically, ingress RBridges can add appropriate S-tags to packets received from customers (note that the S-tag based approach may not work for incoming packets that already have an S-tag). Next, the S-tag can be used to implement virtualization and/or partitioning in the network.

Packet Format

Figure 2:
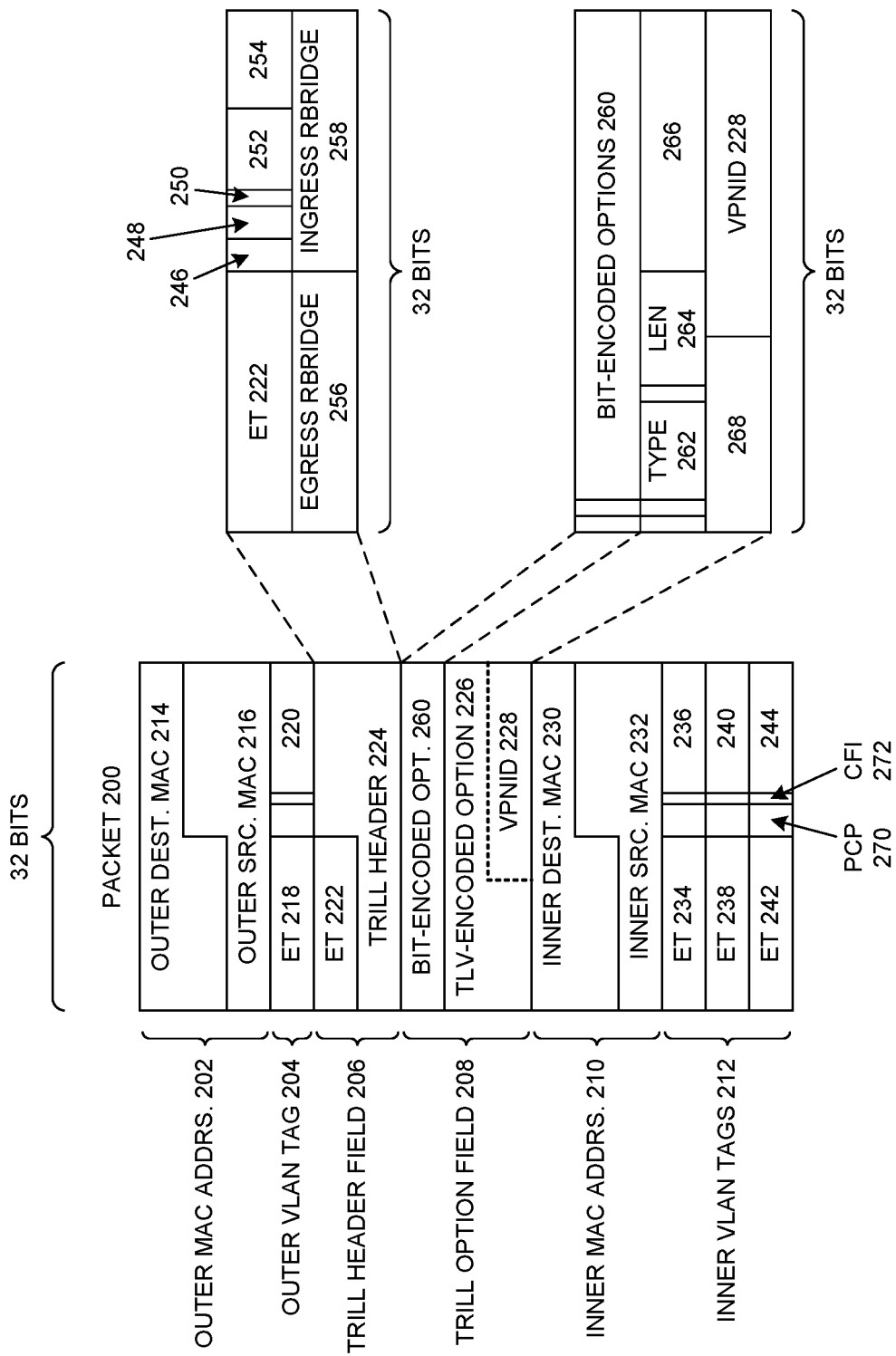
FIG. 2 illustrates a portion of an Ethernet packet which includes a TRILL header in accordance with some embodiments of the present invention.

FIG. 2 illustrates a portion of an Ethernet packet which includes a TRILL header in accordance with some embodiments of the present invention. The packet shown in FIG. 2 is for illustration purposes only, and is not intended to limit the present invention.

Packet 200 can include one or more of the following fields: outer MAC (medium access control) addresses 202, outer VLAN tag 204, TRILL header field 206, TRILL option field 208, inner MAC addresses 210, and inner VLAN tags 212. Typically, the packet is transmitted from top to bottom, i.e., the bits associated with outer MAC addresses 202 will appear on the transmission medium before the bits associated with outer VLAN tag 204 appear on the transmission medium, and so forth. The contents of these fields and their uses are discussed below.

Outer MAC addresses 202 can include outer destination MAC address 214 and outer source MAC address 216. These MAC addresses and outer VLAN tag 204 typically change at each TRILL hop as the packet traverses the service provider's network. Specifically, at each hop, outer source MAC address 216 is associated with the MAC address of the source node (e.g., RBridge) for that hop, outer destination MAC address 214 is associated with the MAC address of the destination node (e.g., RBridge) for that hop, and outer VLAN tag 204 is associated with the VLAN that includes the source node and the destination node for that hop.

Outer VLAN tag 204 can include Ethernet type field 218 and outer VLAN identifier 220. The value of Ethernet type field 218 can indicate that the next field is a VLAN identifier. VLAN identifier 220 can be used in the service provider's network to create multiple broadcast domains.

TRILL header field 206 can include Ethernet type field 222 and TRILL header 224. The value of Ethernet type field 222 can indicate that the next field is a TRILL header. TRILL header 224 can include information for routing the packet through a TRILL network that is embedded in the service provider's network. Specifically, as shown in FIG. 2, TRILL header 224 can include version field 246 which indicates the TRILL version, reserved field 248 which may be reserved for future use, multicast field 250 which indicates whether this packet is a multicast packet, TRILL option length 252 which indicates the length (in terms of 32-bit words) of any TRILL option field that follows the TRILL header, and hop count 254 which may be decremented at each RBridge as the packet traverses the service provider's network.

TRILL header 224 also includes egress RBridge nickname 256 and ingress RBridge nickname 258. Ingress RBridge nickname 258 corresponds to the ingress RBridge which receives the packet from the customer's network, and, for unicast packets, egress RBridge nickname 256 corresponds to the egress RBridge which sends the packet to the customer's network. For multicast packets, egress RBridge nickname 256 corresponds to the RBridge which is the root of the multicast tree on which the packet is to be forwarded. For example, in FIG. 1, when packet 122 is received at ingress RBridge 102, ingress RBridge 102 can use the header information in packet 122 to determine that packet 122 needs to be routed to egress RBridge 110. Next, ingress RBridge 102 can add TRILL header field 206 to packet 122 to obtain packet 124. Specifically, RBridge 102 can set ingress RBridge nickname 258 in packet 124's TRILL header to RBridge 102's nickname, and set egress RBridge nickname 256 in packet 124's TRILL header to RBridge 110's nickname. RBridge 102 can then forward packet 124 based solely or partly on packet 124's TRILL header.

TRILL option field 208 can include bit-encoded options and one or more options encoded in a TLV (type-length-value) format. Specifically, TRILL option field 208 can include bit-encoded options 260 which are one-bit option flags, and TLV-encoded option 226. For example, a 20-bit VPN identifier can be encoded as a TLV-encoded option. Specifically, the value of type field 262 can indicate that this option specifies a VPN identifier. Length field 264 can indicate the length of the data portion of the TLV-encoded option in octets. In the packet shown in FIG. 2, TLV-encoded option 226 is used for specifying a 20-bit VPN identifier, and length field 264 is set to the value 0x6. The data portion of TLV-encoded option 226 begins immediately after length field 264. Specifically, in the packet shown in FIG. 2, the total length (in octets) of fields 266, 268, and 228 is equal to 0x6 as specified by length field 264. Further, as shown in FIG. 2, the last 20 bits of the data portion in TLV-encoded option 226 can be used for specifying VPN identifier 228.

Note that a 20-bit VPN identifier can be specified using a smaller data portion, e.g., only 0x3 octets instead of 0x6 octets. However, some embodiments use the following non-obvious insight: it may be desirable to align the 20-bit VPN identifier with the word boundary to simplify chip design and/or to improve performance. Thus, in some embodiments, 0x6 octets are used instead of 0x3 octets so that the 20-bit VPN identifier is aligned with a 32-bit word boundary. For example, as shown in FIG. 2, VPN identifier 228 is aligned with the 32-bit word boundary.

Inner MAC addresses 210 can include inner source MAC address 232 and inner destination MAC address 230. Inner MAC addresses 210 can be the MAC addresses that were present in the header of the packet that was received from the customer's network. For example, in FIG. 1, suppose a source node in VLAN 112 in customer C3's network at site S1 sends a packet to a destination node in VLAN 112 in customer C3's network at site S5. In this scenario, inner source MAC address 232 can correspond to the source node at site S1, and inner destination MAC address 230 can correspond to the destination node at site S5.

Inner VLAN tags 212 can include one or more VLAN tags. For example, inner VLAN tags 212 can include an S-tag which includes Ethernet type field 234 and S-VLAN-identifier 236, a C-tag which includes Ethernet type field 238 and C-VLAN-identifier 240, and another tag which includes Ethernet type field 242 and VLAN identifier 244. Each VLAN tag in outer VLAN tag 204 and inner VLAN tags 212 can also include a three-bit Priority Code Point (PCP) field (also referred to as the "priority" or "priority bits" in this disclosure), e.g., PCP 270, and a one-bit CFI field, e.g., CFI 272. When an S-tag is used, the CFI field can carry a drop eligibility indicator (DEI) bit. The values in Ethernet type fields (e.g., 234, 238, and 242) can indicate the type of VLAN tag that follows. For example, Ethernet type field 234 and 238 can indicate a VLAN identifier for an S-tag and a VLAN identifier for the C-tag follow the respective Ethernet type fields. The S-tag and the C-tag can be used by the customer to create a stacked-VLAN architecture, e.g., as defined in the Provider Bridging standard. The S-tag may also be used by the service provider to implement network virtualization and/or partitioning. Packet 200 can also include other tags, each tag having a tag-type field which indicates the type of the tag, and a field that stores contents (e.g., an identifier) related to the tag. For example, packet 200 can include a 32-bit congestion-notification-tag (CN-tag) which includes a 16-bit tag-type field and a 16-bit flow-identifier. The congestion-notification-tag may be used by the customer to manage network congestion.

Note that a packet may or may not include all of the fields shown in FIG. 2. For example, in some embodiments, a packet may not include one or more of inner VLAN tags 212 and/or outer VLAN tag 204. Further, certain combinations of fields may not be allowed in some embodiments. For example, in some embodiments, a packet may include either an S-tag or a TRILL option field, but not both. Additionally, the values of some fields may be related to each other. For example, in some embodiments, S-VLAN-identifier 236 may be copied into the 12 least significant bits of VPNID 228.

VLAN tagging is specified in IEEE (Institute of Electrical and Electronics Engineers) standard IEEE 802.1Q. The earlier versions of the standard, including and up to IEEE 802.1Q-2005 of this standard describes how a single VLAN tag can be added to an Ethernet packet to create multiple broadcast domains within the same local area network (LAN). The term Provider Bridging refers to an amendment of this standard which allows an S-tag (a service VLAN tag is sometimes referred to as a provider tag) to be stacked in a single Ethernet packet. Provider Bridging enables a service provider to carry VLAN traffic from multiple customers on a shared network infrastructure without restricting the VLAN address space available to each customer. Further details on Provider Bridging can be found in the specification for standard IEEE 802.1ad.

In some embodiments, the system can add a TRILL header to a Provider Bridging packet. In these embodiments, the packet received from the customer network may include an S-tag. The service provider's network may then add a TRILL header to the packet. In some embodiments, the system may ensure that the priority bits in the outermost VLAN tag are the same as the priority bits in the S-tag.

Remote Port Mirroring

Service provider networks can be very large and complex. Not surprisingly, the network often needs to be debugged. Remote port mirroring is a technique that can be used to identify and resolve network problems.

Figure 3:
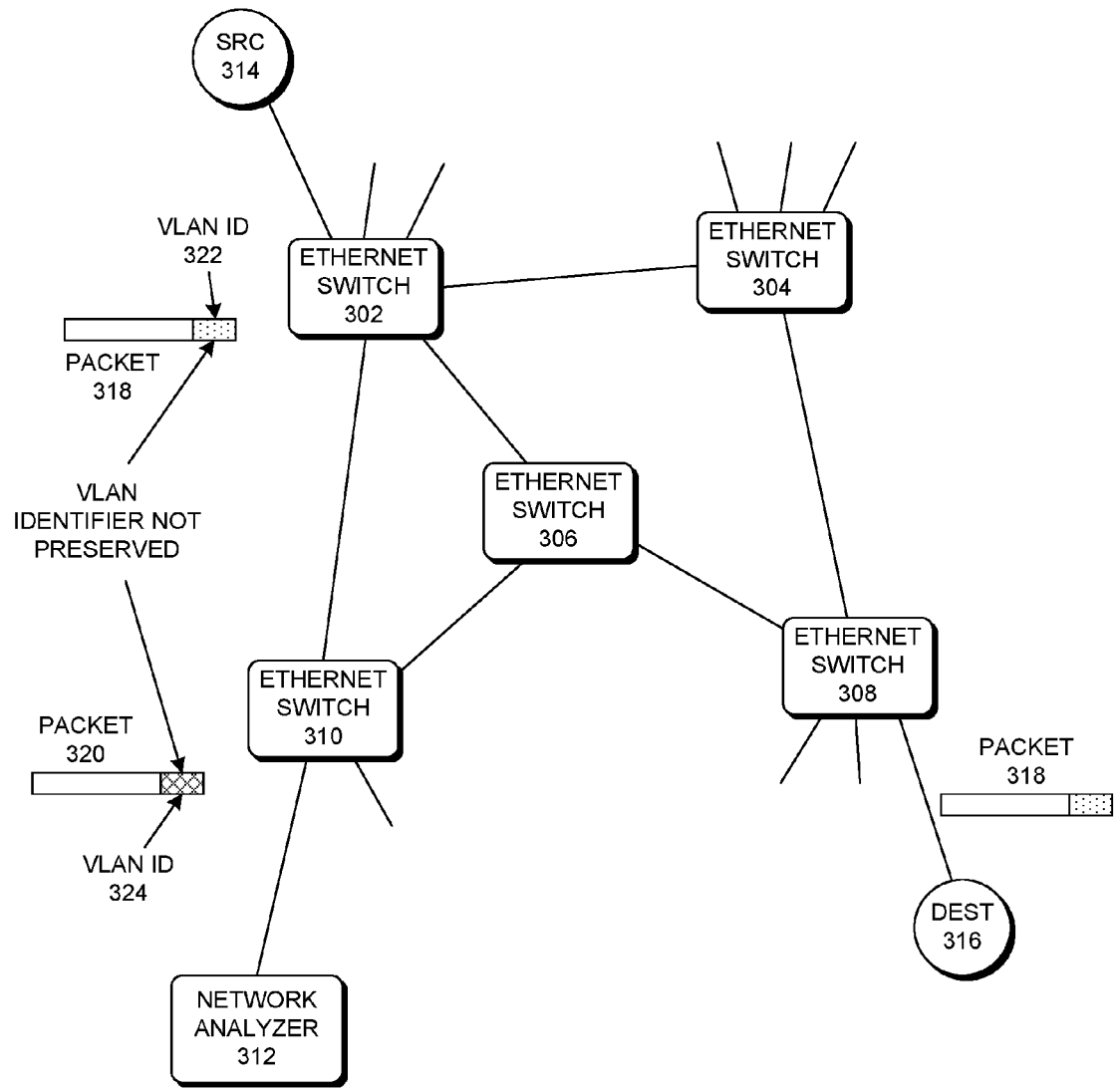
FIG. 3 illustrates a conventional remote port mirroring system.

FIG. 3 illustrates a conventional remote port mirroring system. Ethernet switches 302, 304, 306, 308, and 310 are part of a LAN (local area network). Source node 314 is coupled to Ethernet switch 302, and destination node 316 is coupled to Ethernet switch 308. Network analyzer 312 is coupled to Ethernet switch 310. Network analyzer 312 can be used to analyze packets in the network to identify and resolve problems. In remote port mirroring, copies of packets that are received on a port in the network are sent to a network analyzer.

For example, remote port mirroring can be performed on the port on Ethernet switch 302 which is coupled to source node 314. Suppose packet 318 with a VLAN identifier 322 is received from source 314 on Ethernet switch 302. Further, assume that packet 318 is destined for destination 316. Note that FIG. 3 is for illustration purposes only. The packet format shown in FIG. 3 is not intended to reflect the actual packet format. For example, an Ethernet packet includes source and destination MAC addresses, which have not been shown in FIG. 3 for the sake of clarity.

Ethernet switch 302 will forward the packet with the original VLAN identifier, i.e., VLAN identifier 322 to destination 316. For example, packet 318 may traverse Ethernet switches 302, 306, and 308, before being received at destination 316. In conventional approaches, a copy of packet 318 with a different VLAN identifier is also forwarded in the network for remote port mirroring purposes. Specifically, Ethernet switch 302 creates packet 320 with VLAN identifier 324, which is different from VLAN identifier 322. Ethernet switch 302 then forwards packet 320 to network analyzer 312. Packet 320 may traverse Ethernet switches 302 and 310 before being received at network analyzer 312.

Note that VLAN identifier 324 is used in the network to tag network analysis traffic. Replacing the original VLAN identifier with a VLAN identifier that is specifically used for network analysis traffic enables conventional networks to ensure that these packets are delivered to network analyzers.

Unfortunately, conventional port mirroring techniques may not be able to identify and/or resolve certain network problems. Specifically, since conventional networks modify the original VLAN identifier, the packet that is received at the network analyzer is not the original packet. If the original VLAN identifier was one of the causes of the network problem, the network analyzer will not be able to identify and/or resolve the network problem.

In contrast to conventional techniques, some embodiments of the present invention encapsulate the copy of the packet, and forward the encapsulated copy of the packet to a network analyzer. Since some embodiments of the present invention encapsulate the copy of the packet, they preserve the original VLAN identifier and optionally preserve other header information in the original packet.

Typically, when a packet is encapsulated to obtain an encapsulated packet, the entire contents of the packet are preserved. The encapsulated packet usually has its own header which is used for forwarding the encapsulated packet. According to one definition of encapsulation, encapsulation is a process which adds new fields to the packet header which are used for forwarding the encapsulated packet. For example, a packet can be encapsulated by adding a TRILL header to the packet which is then used for routing the packet through the network. Merely modifying the VLAN tag is not encapsulation because no new fields are added to the header, and because the original VLAN tag is not preserved.

Figure 4A:
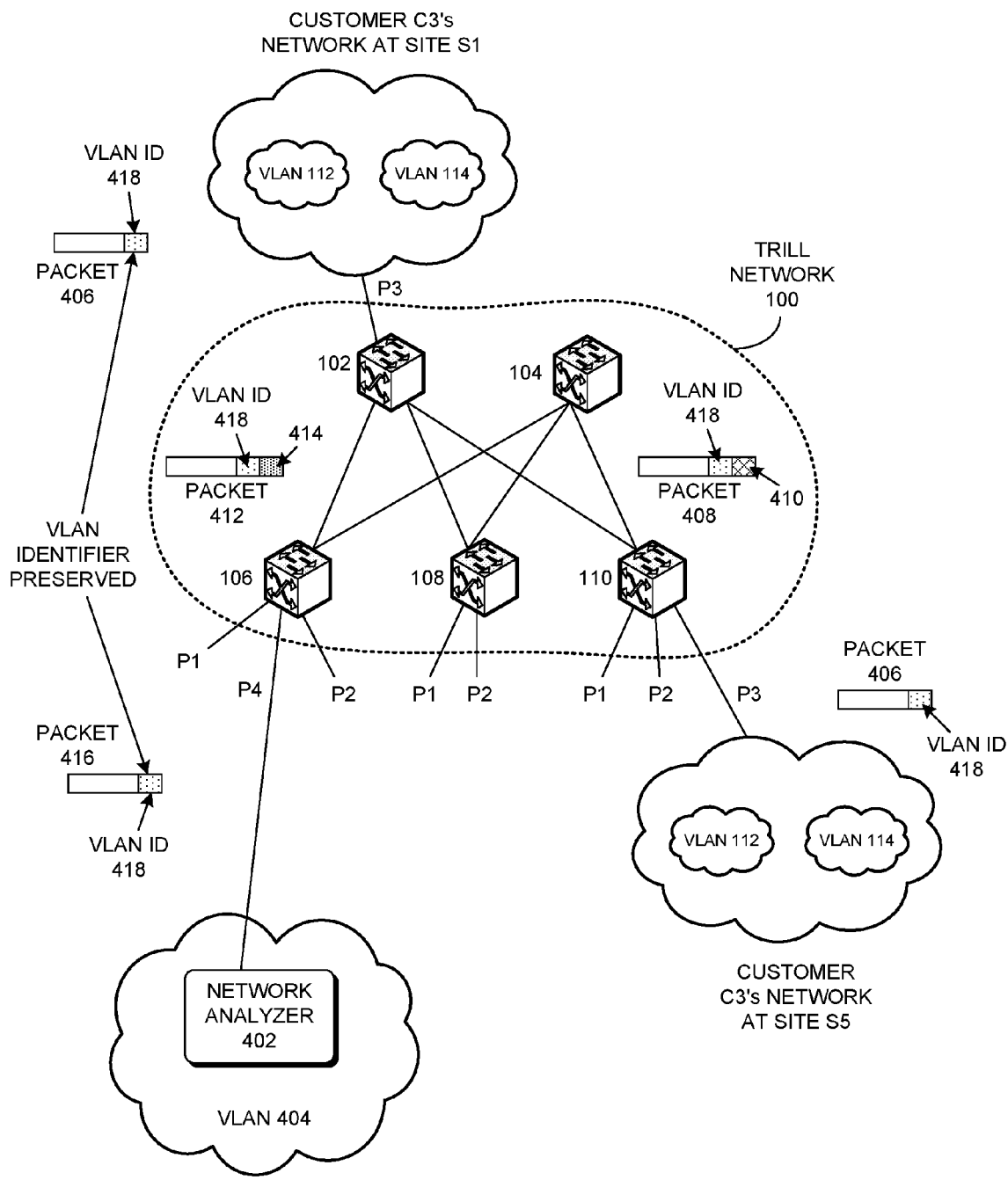
FIG. 4A illustrates a remote port mirroring system which uses encapsulation in accordance with some embodiments of the present invention.

FIG. 4A illustrates a remote port mirroring system which uses encapsulation in accordance with some embodiments of the present invention.

Suppose packet 406 with VLAN identifier 418 is sent from a source node in VLAN 112 in customer C3's network at site S1 to a destination node in VLAN 112 in customer C3's network at site S5.

When packet 406 is received on port P3 of RBridge 102, packet 406 can be encapsulated with TRILL header 410 to obtain encapsulated packet 408. Encapsulated packet 408 can then be routed through TRILL network 100 to RBridge 110. RBridge 110 can then extract packet 406 from encapsulated packet 408, and forward packet 406 to the destination node in VLAN 112 in customer C3's network at site S5. Note that, in the above example, packet 406 is an Ethernet packet (with or without one or more VLAN tags), and encapsulated packet 408 is a TRILL packet.

Some embodiments of the present invention can perform remote port mirroring at an arbitrary level of granularity, and can use arbitrarily complex criteria to determine which packets to mirror. Specifically, remote port mirroring can be enabled for packets that are received or sent on a particular port, that have a specific VLAN tag, that originate from a particular source node, that are destined for a particular destination node, or that match a combination of these criteria. In general, the system may use an arbitrarily complex logical function (e.g., an access control list) to identify packets that need to be mirrored.

Let us assume that remote port mirroring has been enabled on port P3 of RBridge 102, and packet 406 has been identified as a packet that needs to be mirrored. In this case, RBridge 102 can create a copy of packet 406, and encapsulate the copy of packet 406 using TRILL header 414 to obtain encapsulated packet 412. Encapsulated packet 412 can then be routed through TRILL network 100 to RBridge 106. Note that TRILL header 414 is different from TRILL header 410. Specifically, TRILL header 410 causes packet 408 to be routed to RBridge 110, whereas TRILL header 414 causes encapsulated packet 412 to be routed to RBridge 106. RBridge 106 can then extract the copy of packet 406 (shown as packet 416 in FIG. 4A) from encapsulated packet 412, and forward the copy of packet 406 to network analyzer 402 which may belong to VLAN 404. VLAN 404 may have been specifically created for analyzing network traffic. The packet that is sent to the network analyzer may include some indication that the packet is a mirrored packet. For example, if mirrored packets have a specific VLAN identifier (e.g., VLAN 404 as shown in FIG. 4A), then the VLAN identifier can be used to indicate that the packet is a mirrored packet.

Note that the VLAN identifier was not modified, i.e., the VLAN identifier in packet 416 is the same as the VLAN identifier in packet 406. In this manner, some embodiments of the present invention facilitate debugging the network by preserving VLAN identifier information during remote port mirroring.

Remote port mirroring can also be enabled on ports that are internal to the TRILL network. In these embodiments, an additional TRILL header can be added to preserve the original TRILL header.

Figure 4B:
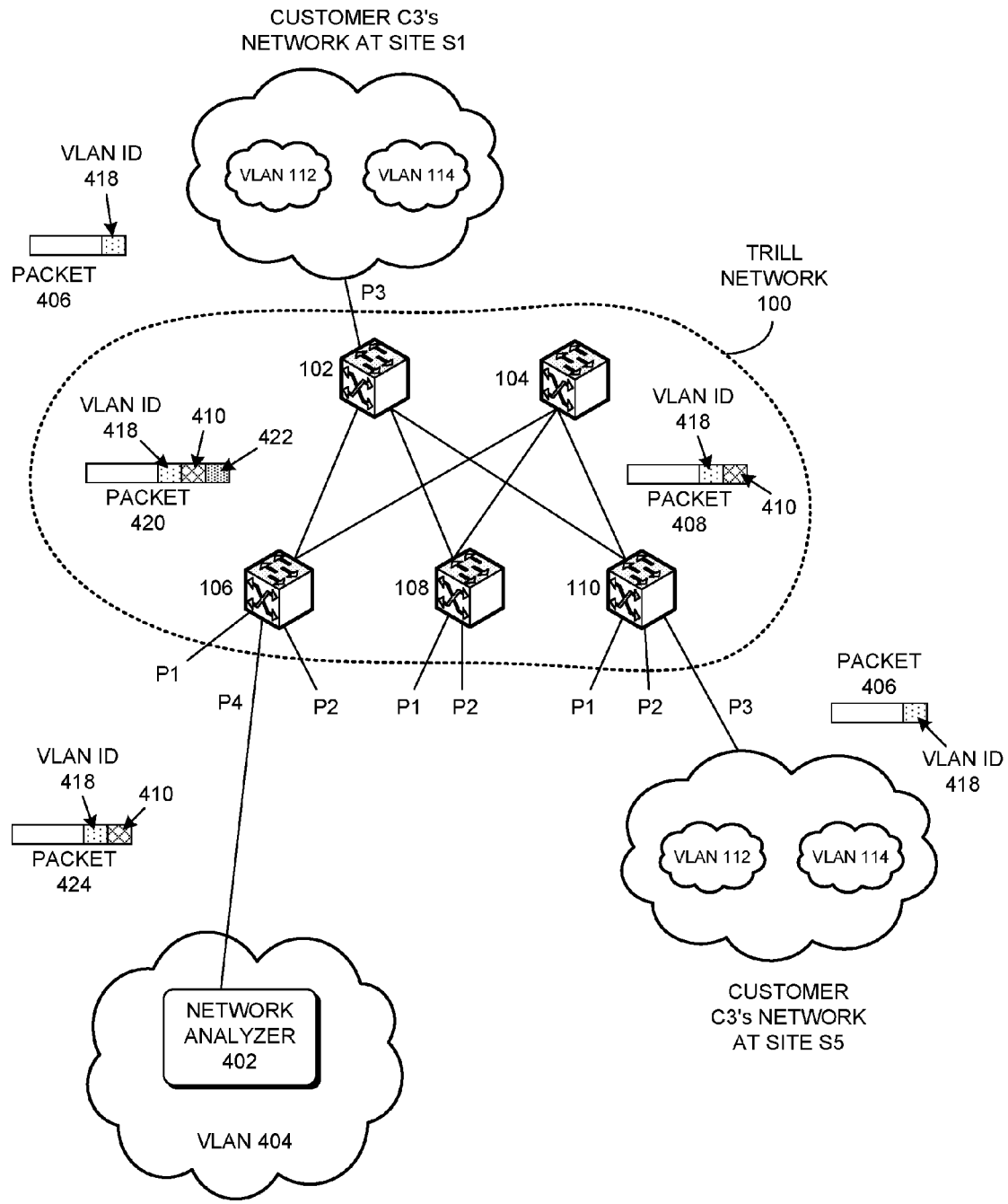
FIG. 4B illustrates a remote port mirroring system which uses encapsulation in accordance with some embodiments of the present invention.

FIG. 4B illustrates a remote port mirroring system which uses encapsulation in accordance with some embodiments of the present invention.

As before, RBridge 102 can encapsulate packet 406 with TRILL header 410 to obtain encapsulated packet 408. Encapsulated packet 408 can then be routed through TRILL network 100 to RBridge 110. RBridge 110 can then extract packet 406 from encapsulated packet 408, and forward packet 406 to the destination node in VLAN 112 in customer C3's network at site S5.

Let us assume that remote port mirroring has been enabled on the port on RBridge 102 that couples RBridge 102 with RBridge 106, and packet 408 has been identified as a packet that needs to be mirrored. In this case, RBridge 102 can create a copy of packet 408 and encapsulate the copy of packet 408 using TRILL header 422 to obtain encapsulated packet 420. Next, encapsulated packet 420 can be routed through TRILL network 100 to RBridge 106. Note that TRILL header 422 is different from TRILL header 410. Specifically, TRILL header 410 causes packet 408 to be routed to RBridge 110, whereas TRILL header 422 causes encapsulated packet 420 to be routed to RBridge 106. RBridge 106 can then extract the copy of packet 408 (shown as packet 424 in FIG. 4B) from encapsulated packet 420, and forward the copy of packet 408 to network analyzer 402 which may belong to VLAN 404. Note that, in the above example, encapsulated packets 408 and 420 are TRILL packets.

Figure 5:
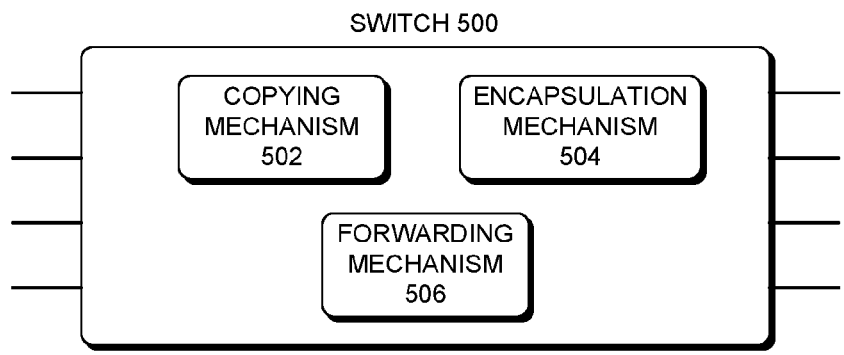
FIG. 5 illustrates a switch in accordance with some embodiments of the present invention.

FIG. 5 illustrates a switch in accordance with some embodiments of the present invention.

Switch 500 can include a plurality of mechanisms which may communicate with one another via a communication channel, e.g., a bus. Switch 500 may be realized using one or more integrated circuits. In some embodiments, switch 500 is an RBridge (e.g., RBridge 102) which includes copying mechanism 502, encapsulation mechanism 504, and forwarding mechanism 506.

Switch 500 may receive a packet which may be destined for destination address D1 (e.g., the header information of the packet may include destination address D1). Copying mechanism 502 may be configured to create a copy of the packet. In some embodiments, copying mechanism 502 may be configured to first identify which packets need to be mirrored, and then create copies of the identified packets. The packet that is being mirrored can be an Ethernet packet (with or without one or more VLAN tags) or a TRILL packet.

Encapsulation mechanism 504 may be configured to encapsulate the copy of the packet to obtain an encapsulated packet which is destined for destination address D2 (e.g., the header information of the encapsulated packet may include destination address D2). In some embodiments, the encapsulated packet is a TRILL packet. Destination address D2 may or may not be the same as destination address D1. A destination address can be a unicast, a multicast, or a broadcast address. Specifically, in some embodiments, the first packet is either a unicast packet or a multicast packet, and the second packet is either a unicast packet that is sent to a network analyzer or a multicast packet which is sent to a multicast address which is associated with a multicast group that includes the network analyzer. Note that encapsulating the copy of the packet to obtain an encapsulated packet preserves header information of the original packet (e.g., VLAN identifier, TRILL header, etc.).

Forwarding mechanism 506 may be configured to forward the original packet according to address D1, and forward the encapsulated packet according to address D2. For example, forwarding mechanism 506 may first perform a forwarding lookup (e.g., by performing a lookup in a ternary context addressable memory) for addresses D1 and D2 to determine the output ports for the two packets. Next, forwarding mechanism 506 may queue the packets to be sent through the appropriate output ports.

Note that FIG. 5 is for illustration purposes only, and is not intended to limit the present invention to the forms disclosed. Specifically, in some embodiments, switch 500 may not be an RBridge, and/or may include fewer or more mechanisms than those shown in FIG. 5.

Figure 6:
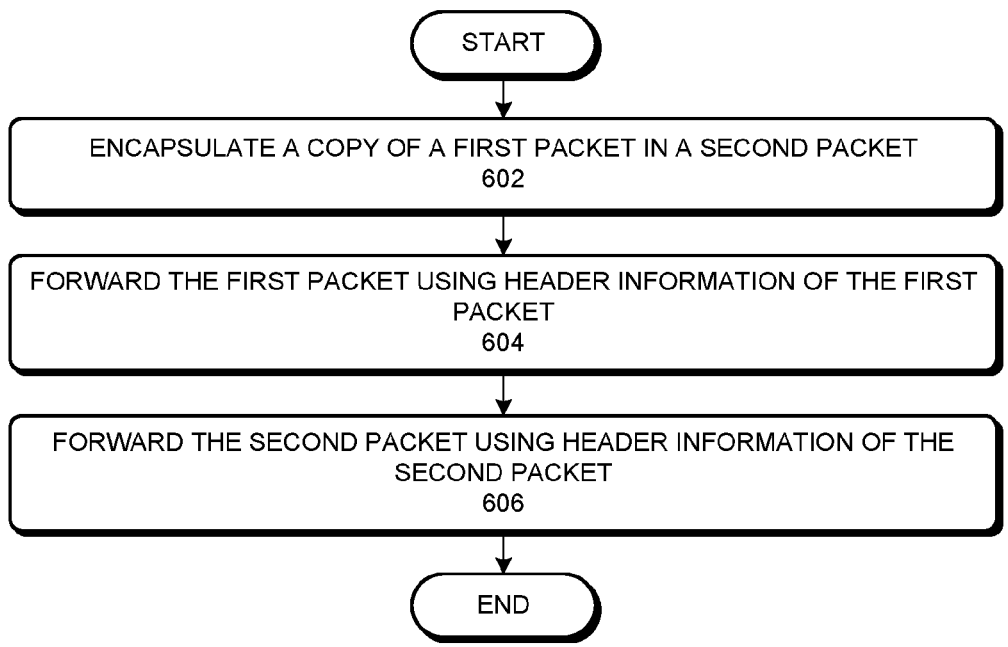
FIG. 6 presents a flowchart that illustrates a process for performing remote port mirroring in accordance with some embodiments of the present invention.

FIG. 6 presents a flowchart that illustrates a process for performing remote port mirroring in accordance with some embodiments of the present invention.

The process can be performed by a switch, e.g., RBridge 102. The switch may receive a first packet, e.g., packet 406. The switch may then determine whether the first packet is to be mirrored. If the first packet is to be mirrored, the switch may create a copy of the first packet.

Next, the switch may encapsulate the copy of the first packet in a second packet, e.g., packet 412 (operation 602). Note that the first packet and second packet may be destined for different addresses. The first packet and the second packet can be unicast, multicast, or broadcast packets. Specifically, in some embodiments, the first packet is either a unicast packet or a multicast packet, and the second packet is either a unicast packet that is sent to a network analyzer or a multicast packet which is sent to a multicast address which is associated with a multicast group that includes the network analyzer.

The switch can then forward the first packet using header information of the first packet (operation 604), and forward the second packet using the header information of the second packet (operation 606). Note that operations 604 and 606 may be performed sequentially (in any order) or concurrently.

Figure 7:
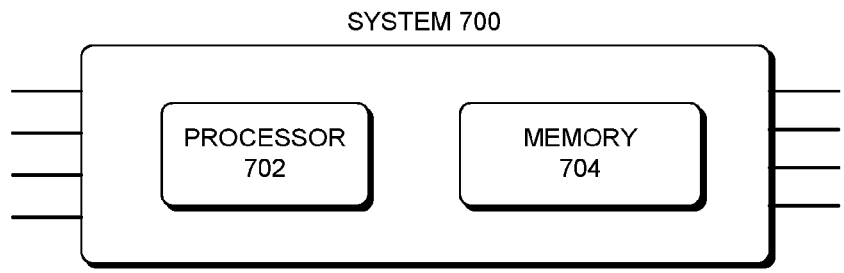
FIG. 7 illustrates a system in accordance with some embodiments of the present invention.

FIG. 7 illustrates a system in accordance with some embodiments of the present invention.

System 700 can include processor 702 (e.g., a network processor) and memory 704. Processor 702 may be capable of accessing and executing instructions stored in memory 704. For example, processor 702 and memory 704 may be coupled by a bus. Memory 704 may store instructions that when executed by processor 702 cause system 700 to perform the process illustrated in FIG. 6. Specifically, in some embodiments, memory 704 may store instructions for encapsulating a copy of a first packet in a second packet, instructions for forwarding the first packet using header information of the first packet, and instructions for forwarding the second packet using header information of the second packet.

The data structures and code described in this disclosure can be partially or fully stored on a non-transitory computer-readable storage medium and/or a hardware module and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes.

The methods and processes described in this disclosure can be partially or fully embodied as code and/or data stored in a computer-readable storage medium or device, so that when a computer system reads and/or executes the code and/or data, the computer system performs the associated methods and processes. The methods and processes can also be partially or fully embodied in hardware modules or apparatuses, so that when the hardware modules or apparatuses are activated, they perform the associated methods and processes. Further, the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A switch, comprising:
one or more ports;
packet processing circuitry configured to:
generate a copy of a first packet, wherein a header of the copy of the first packet includes a first identifier of a first virtual local area network (VLAN); and
include a second identifier of a second VLAN in the header of the copy of the first packet, wherein the second identifier corresponds to mirrored traffic;
encapsulation circuitry configured to generate a second packet by encapsulating the copy of the first packet with a first encapsulation header; and
forwarding circuitry configured to identify a port associated with a destination address of the first encapsulation header from the one or more ports as an egress port for the second packet, wherein the destination address of the first encapsulation header corresponds to port mirroring.

2. The switch of claim 1, wherein encapsulation circuitry is further configured to generate a third packet by encapsulating the first packet with a second encapsulation header; and
wherein the forwarding circuitry is further configured to identify a port associated with a destination address of the second encapsulation header from the one or more ports as an egress port for the third packet.

3. The switch of claim 2, wherein the packet processing circuitry is further configured to determine the destination address of the second encapsulation header based on a destination address of the header of the first packet.

4. The switch of claim 1, wherein the packet processing circuitry is further configured to learn a source address of the header of the first packet.

5. The switch of claim 1, wherein the packet processing circuitry is further configured to determine whether to generate the copy of the first packet based on one or more of: an access control list, an ingress port, an egress port, a VLAN tag, a source identifier, and a destination identifier.

6. The switch of claim 1, wherein the destination address of the first encapsulation header is a multicast address of a multicast group.

7. The switch of claim 1, wherein the copy of the first packet indicates that the copy of the first packet is a mirrored packet.

8. A non-transitory computer-readable storage medium storing instructions that when executed by a computer cause the computer to perform a method for facilitating port mirroring, the method comprising:
generating a copy of a first packet at a switch, wherein a header of the copy of the first packet includes a first identifier of a first virtual local area network (VLAN);
including a second identifier of a second VLAN in the header of the copy of the first packet, wherein the second identifier corresponds to mirrored traffic;
generating a second packet by encapsulating the copy of the first packet with a first encapsulation header; and
identifying a port associated with a destination address of the first encapsulation header from one or more ports of the switch as an egress port for the second packet, wherein the destination address of the first encapsulation header corresponds to port mirroring.

9. The computer-readable storage medium of claim 8, wherein the method further comprises:
generating a third packet by encapsulating the first packet with a second encapsulation header; and
identifying a port associated with a destination address of the second encapsulation header from the one or more ports as an egress port for the third packet.

10. The computer-readable storage medium of claim 9, wherein the method further comprises determining the destination address of the second encapsulation header based on a destination address of the header of the first packet.

11. The computer-readable storage medium of claim 8, wherein the method further comprises learning a source address of the header of the first packet.

12. The computer-readable storage medium of claim 8, wherein the method further comprises determining whether to generate the copy of the first packet based on one or more of: an access control list, an ingress port, an egress port, a VLAN tag, a source identifier, and a destination identifier.

13. The computer-readable storage medium of claim 8, wherein the destination address of the first encapsulation header is a multicast address.

14. The computer-readable storage medium of claim 8, wherein the copy of the first packet indicates that the copy of the first packet is a mirrored packet.

15. A computer system for facilitating port mirroring in a network, the computer system comprising:
one or more ports;
a processor; and
a storage device storing instructions that when executed by the processor cause the processor to perform a method, the method comprising:
generating a copy of a first packet, wherein a header of the copy of the first packet includes a first identifier of a first virtual local area network (VLAN);
including a second identifier of a second VLAN in the header of the copy of the first packet, wherein the second identifier corresponds to mirrored traffic;
generating a second packet by encapsulating the copy of the first packet with a first encapsulation header; and
identifying a port associated with a destination address of the first encapsulation header from the one or more ports as an egress port for the second packet, wherein the destination address of the first encapsulation header corresponds to port mirroring.

16. The computer system of claim 15, wherein the method further comprises:
generating a third packet by encapsulating the first packet with a second encapsulation header;
determining a destination address of the second encapsulation header based on a destination address of the header of the first packet; and
identifying a port associated with the destination address of the second encapsulation header from the one or more ports as an egress port for the third packet.

17. The computer system of claim 15, wherein the method further comprises learning a source address of the header of the first packet.

18. The computer system of claim 15, wherein the method further comprises determining whether to generate the copy of the first packet based on one or more of: an access control list, an ingress port, an egress port, a VLAN tag, a source identifier, and a destination identifier.

19. The computer system of claim 15, wherein the destination address of the first encapsulation header is a multicast address of a multicast group.

20. The computer system of claim 15, wherein the copy of the first packet indicates that the copy of the first packet is a mirrored packet.

* * * * *